United States Patent
Leyvi et al.

(10) Patent No.: US 6,954,234 B2
(45) Date of Patent: Oct. 11, 2005

(54) DIGITAL VIDEO DATA SIGNAL PROCESSING SYSTEM AND METHOD OF PROCESSING DIGITAL VIDEO DATA SIGNALS FOR DISPLAY BY A DVI-COMPLIANT DIGITAL VIDEO DISPLAY

(75) Inventors: Evgeniy Leyvi, Fair Lawn, NJ (US); Joseph K. Masters, Mahopac, NY (US)

(73) Assignee: Koninklijke Philips Electronics N.V, Eindhoven (NL)

( * ) Notice: Subject to any disclaimer, the term of this patent is extended or adjusted under 35 U.S.C. 154(b) by 605 days.

(21) Appl. No.: 09/974,438

(22) Filed: Oct. 10, 2001

(65) Prior Publication Data

US 2003/0067552 A1 Apr. 10, 2003

(51) Int. Cl.[7] .................................................. H04N 7/01
(52) U.S. Cl. ....................... 348/453; 348/469; 348/441; 348/472
(58) Field of Search ................................ 348/453, 469, 348/441, 471, 472; 375/244, 157; 710/8, 10, 11, 65, 70, 72, 73

(56) References Cited

U.S. PATENT DOCUMENTS

| | | | |
|---|---|---|---|
| 2001/0034866 A1 * | 10/2001 | Barry et al. | 714/734 |
| 2002/0034248 A1 * | 3/2002 | Chen | 375/240.08 |
| 2002/0106082 A1 * | 8/2002 | Kori et al. | 380/202 |
| 2002/0136241 A1 * | 9/2002 | Pasqualino et al. | 370/493 |
| 2002/0180725 A1 * | 12/2002 | Simmonds et al. | 345/213 |
| 2003/0038807 A1 * | 2/2003 | Demos et al. | 345/473 |

OTHER PUBLICATIONS

"Bit–Serial Digital Interface for High–Definition Television Systems", pp. 1–9; Oct. 1, 1998, SMPTE 292M–1998.
"Digital Display Working Group", Digital Visual Interface DVI, Apr. 2, 1999, pp. 1–76.

* cited by examiner

Primary Examiner—Victor Kostak

(57) ABSTRACT

A system and method allows a high-bandwidth serial or parallel digital video broadcast data signal to be monitored on a low-cost digital display device such as a computer monitor. The system includes means for extracting horizontal and vertical synchronization information and clock from the digital video broadcast data signal, and a transmitter converting the digital video data signal and the horizontal and vertical synchronization information and the clock into a Digital Visual Interface (DVI)-compliant digital video data signal. Beneficially, the system also includes: a color space converter converting the digital video broadcast data signal from a first color format to a second color format; a serial video data receiver receiving a serial digital video broadcast data signal and providing parallel non-return to zero inverted (NRZI) digital video data and a clock, synchronized to the parallel NRZI digital video data; an NRZI descrambler receiving the parallel NRZI digital video data and providing therefrom framed parallel digital video data; and a scan converter converting the digital video data signal into a digital video format suitable for display on the digital display device.

21 Claims, 2 Drawing Sheets

DIGITAL VIDEO DATA SIGNAL PROCESSING SYSTEM AND METHOD OF PROCESSING DIGITAL VIDEO DATA SIGNALS FOR DISPLAY BY A DVI-COMPLIANT DIGITAL VIDEO DISPLAY

BACKGROUND OF THE INVENTION

1) Field of the Invention

This invention pertains to the field of video signal distribution and display, and more particularly, to distributing and processing digital video data signals for display on digital video display devices.

2) Description of the Related Art

With the transition from conventional analog broadcast standards to digital high definition television (HDTV) broadcasts, all aspects of video signal generation, production, editing, and distribution are rapidly moving from analog systems to digital systems. Today's professional television technology widely uses high speed uncompressed serial and parallel digital video data signal transmissions to send video signals over long distances inside television studios, post production facilities, and video storage facilities.

The Society of Motion Picture and Television Engineers (SMPTE) has defined protocols that are widely employed for these types of data transmissions, and SMPTE has established and published standards for these protocols. For example, SMPTE 292M-1998 defines a standard protocol for a "Bit-Serial Digital Interface for High-Definition Television Systems." Similarly, SMPTE 260M-1999 defines a standard protocol for a "Digital Representation and Bit-Parallel Interface" for an 1125/60 High Definition Production System. SMPTE 292M-1998 and SMPTE 260M-1999 are each hereby incorporated by reference for all purposes as if fully set forth herein. Also, SMPTE 296M-2001 defines a standard protocol for "1280×720 Progressive Image Sample Structure—Analog and Digital Representation and Analog Interface" and SMPTE 274M1998 defines a standard protocol for "1920×1080 Scanning and Analog and Parallel Digital Interfaces for Multiple Picture Rates." For standard definition systems: SMPTE 259M-1997 defines a standard protocol for "10-Bit 4:2:2 Component and 4fsc Composite Digital Signals—Serial Digital Interface;" SMPTE 267M-1995 defines a standard protocol for "Bit-Parallel Digital Interface—Component Video Signal 4:2:2 16×9 Aspect Ratio;" and SMPTE 125M-1995 defines a standard protocol for "Component Video Signal 4:2:2—Bit-Parallel Digital Interface."

In particular, serial digital video transmissions are often preferred, especially for longer distances. One reason that serial transmission is often preferred is that parallel transmission suffers from problems due to propagation delay differences and crosstalk among the parallel lines. Also, for example, SMPTE 274M-1998 defines the maximum length for parallel transmission lines to be no more than 20 meters. Furthermore, serial transmission cables require fewer lines and connecting pins, and therefore can be made lighter and lower-cost.

To monitor an actual video signal carried by data streams compliant with these protocols, a special, expensive digital video display monitor is needed that can process these data streams. For example, a 450-line resolution (standard definition) 8' SONY® BVM-8045QD video display monitor with a built-in SMPTE-259M serial digital interface currently has a retail list price of $2,800.

Accordingly, it would be desirable to provide a system and method for converting high speed uncompressed serial and parallel digital video data signals, commonly used in television studios, post production facilities, and video storage facilities, into a format wherein the video data can be displayed on a low cost digital display device. It would further be desirable to provide a device and method for converting digital video data signals compliant with SMPTE standards into digital video data signals that can be displayed on low cost digital display devices. Other and further objects and advantages will appear hereinafter.

SUMMARY OF THE INVENTION

The present invention comprises a method and system for monitoring a high-bandwidth serial or parallel digital video broadcast data signal on a low-cost digital display device such as a computer monitor.

In one aspect of the invention, a system for monitoring a serial digital video broadcast data signal on a digital video display device includes: a serial video data receiver receiving the serial digital video broadcast data signal and providing parallel non-return to zero inverted (NRZI) digital video data and a clock, synchronized to the parallel NRZI digital video data; an NRZI descrambler receiving the parallel NRZI digital video data and providing therefrom framed parallel digital video data; a color space converter converting the framed parallel video data from a first color format to a second color format; a synchronizer generating horizontal and vertical synchronization signals for the color converted framed parallel video data; a scan converter converting the color converted framed parallel video data into a scan format suitable for display on the digital video display device; and a digital visual interface driver receiving the color converted framed parallel video data and providing therefrom to the digital video display device a digital visual display signal.

In another aspect of the invention, a digital video signal processing device for processing a digital video data signal into a form suitable for display on a target digital video display includes means for extracting horizontal and vertical synchronization information from the digital video data signal and a Digital Visual Interface (DVI) transmitter receiving the digital video data signal and the horizontal and vertical synchronization information, and providing therefrom a DVI-compliant digital video data signal to the target digital video display.

In yet another aspect of the invention, a method of processing a digital video data signal for display on a target video display, includes extracting horizontal and vertical synchronization information from the digital video data signal, and converting the digital video data signal and the horizontal and vertical synchronization information into a Digital Visual Interface (DVI)-compliant digital video data signal.

DESCRIPTION OF THE PREFERRED EMBODIMENTS

The "Digital Visual Interface (DVI)" specification, produced by the Digital Display Working Group (DDWG), defines a standard for a low cost high speed digital video connection which is display technology independent and supports many video display standards, in addition to the broadcast television standards, between a digital video source, such as a computing device with a digital video card (e.g., a personal computer) and a relatively non-expensive display device (e.g., a monitor). The "Digital Visual Interface (DVI)" specification is hereby incorporated herein by reference for all purposes as if fully set forth herein. Because DVI-compliant display monitors receive and display a high bandwidth (i.e., high data rate) digital video data signal, such monitors can provide a high quality video display suitable for a broadcast television studio, post-production facility, or video storage facility. Also, because DVI-compliant display monitors are mass-produced in volume, they are expected to be widely available and relatively inexpensive.

Accordingly, a display device having a DVI-compliant video input is considered as a good candidate for a low cost display device for displaying high-bandwidth digital video data signals in a broadcast studio, a post-production facility, or a video storage facility.

However, a system and method is still needed for processing a digital video broadcast data signal, such as a SMPTE 292M-1998 or SMPTE 259M-1997 bit-serial digital video data signal, such that it can be displayed on a DVI-compliant video display monitor.

Figure 1:
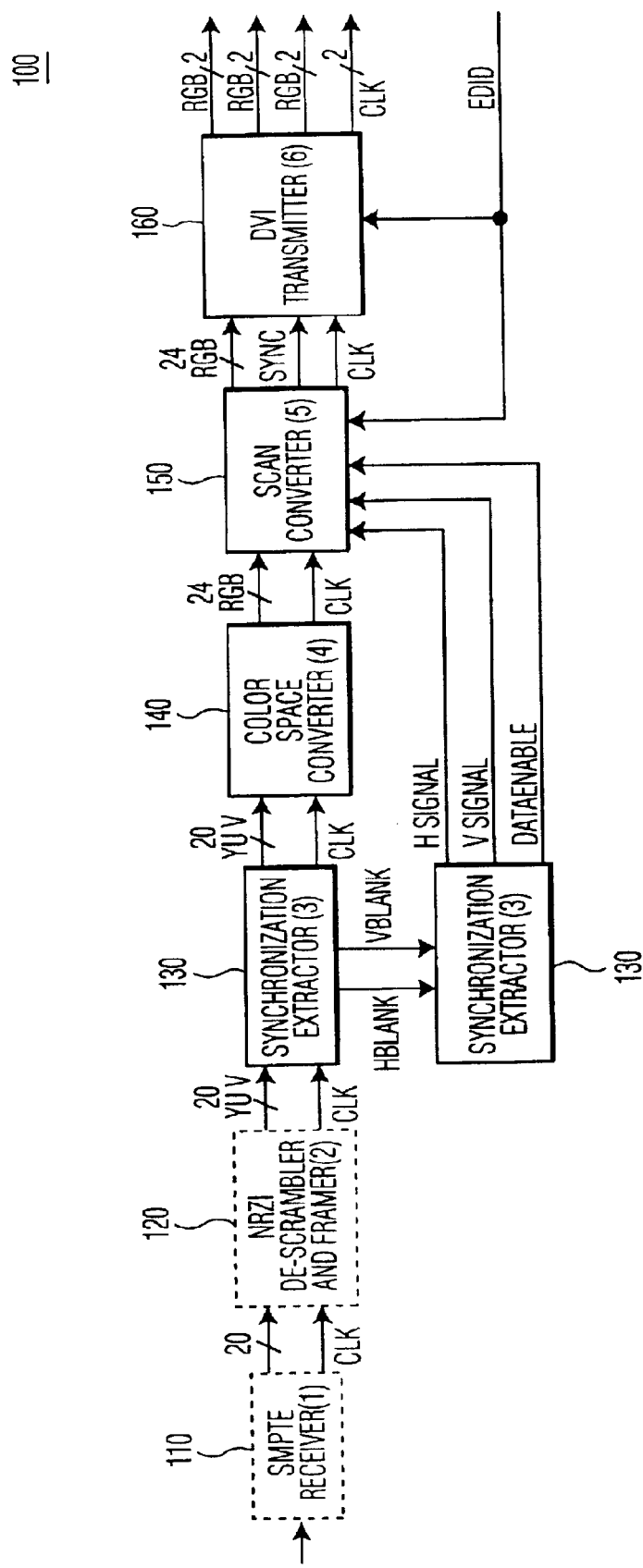
FIG. 1 is a functional block diagram of a system for processing a digital video data signal into a format suitable for display on a target digital video display.

Accordingly, FIG. 1 shows a preferred embodiment system 100 for processing a serial or parallel digital video data signal into a form suitable for display on a target digital video display. The system 100 includes a SMPTE serial data receiver 110, a parallel data NRZI (non-return to zero inverted) de-scrambler and framer 120, a synchronizer 130, a color space converter 140, a scan converter 150, and a DVI transmitter 160. Beneficially, the system 100 comprises an all-digital video data signal processing system.

The SMPTE serial data receiver 110 receives a serial digital video data signal, which may be a serial digital video broadcast data signal, such as a SMPTE 292M-1998 or SMPTE 259M-1997 compliant bit-serial digital video data signal. The SMPTE serial data receiver 110 extracts the data clock and de-serializes the received serial digital video broadcast data signal to form parallel non-return to zero inverted (NRZI) digital video data and a clock synchronized to the parallel NRZI digital video data—e.g., a parallel (20 bits) video data stream and clock. Beneficially, the SMPTE serial data receiver 110 includes an integrated circuit such as the S8501 from Applied Micro Circuits Corporation (AMCC). Alternatively, a GD14516 IC from GIGA Corp., or a GS1545/40 IC from Gennum Corp., can be used for this stage in the case of a high definition signal. The SMPTE serial data receiver 110 is only required if the received digital video broadcast data signal is in serial format (e.g., SMPTE 292M-1998; SMPTE 259M-1997). Otherwise, if the received digital video broadcast data signal is in parallel format, it can be omitted or bypassed.

The de-scrambler/framer 120 receives the parallel NRZI digital video data and decodes the parallel data to form framed parallel digital video data. Beneficially, the framed parallel digital video data comprises a 4:2:2 component data stream. Where the received digital video broadcast data signal is a SMPTE 292M-1998 or a SMPTE 259M-1997 standard signal, for example, the received data is encoded using a scrambled non-return to zero inverted (NRZI) format. According to the SMPTE 292M-1998 and SMPTE 259M-1997 standards, a generator polynomial of the form $G_1(x)=x^9+x^4+1$ is used to scramble the NRZ data. Polarity-free scrambled NRZI sequence data is produced by a second generator polynomial $G_2(x)=X+1$. Accordingly, the de-scrambler/framer 120 applies an inverse polynomial function to the received data to de-scramble it. The de-scrambler/framer 120 can be implemented, for example, in a dedicated Field Programmable Gate Array (FPGA), a Programmable Logic Device (PLD), or an Application Specific Integrated Circuit (ASIC), or it can be implemented together with the SMPTE serial data receiver 100 when the Giga IC mentioned above is used. Where the digital video broadcast data signal is originally received in a parallel format, the de-scrambler/framer 120 is not required and may be omitted or bypassed.

The synchronizer 130 receives framed parallel digital video data and a clock, and extracts synchronization information embedded in the parallel video data stream and generates therefrom horizontal (H) and vertical (V) synchronization signals. Where the received signal is a either a serial or parallel high-definition or standard definition SMPTE-compliant digital video data signal, a synchronization extractor component of the synchronizer 130 finds the start of active video (SAV) and end-of active video (EAV) timing reference signals in the data stream to extract vertical and horizontal blanks from the active video. Details of the SAV and EAV codes may be found, for example, in FIG. 2 and Table 2 of SMPTE 292M-1998. After obtaining the proper timing from the SAV and EAV timing reference signals, the synchronizer 130 generates horizontal (H) and vertical (V) sync signals, and a DataEnable signal having a pulse width equal to the time difference between each EAV code and the subsequent SAV code. Beneficially, the synchronizer 130 may include counters driven by the clock signal to produce properly timed H and V sync signals. The synchronizer 130 may be implemented, for example, using an FPGA, a PLD, or a dedicated ASIC.

For a SMPTE 292M-1998 standard signal, for example, the video data is in 4:2:2 YUV color space (Y sampled at every pixel, U and V sampled at every second pixel horizontally on each line), as is well known to those skilled in the art. However, many DVI devices require the video data to be received in a red/green/blue (RGB) color space, for example an 8:8:8 RGB color format. Indeed, the DVI standard itself states that a DVI system must, at a minimum, support a 24-bit MSB aligned RGB color format, as defined in the VESA EDID specification. (However, some DVI monitors may also support non-RGB color formats, and in that case, color conversion may not be necessary). Therefore, it is often necessary to convert the received video data from a first (e.g., YUV) color space, to a second (e.g., RGB) color space.

Accordingly, the system 100 beneficially includes the color space converter 140 for performing a color format conversion. Beneficially, the color space converter 140 may include a look-up table that inputs a 20-bit YUV video data word (YUV color format) and in response thereto outputs a corresponding 24 bits of RGB video data (RGB color format). Also beneficially, the input clock and output clock for the color space converter 140 both have a same frequency. Also beneficially, the color space converter 140 may output 48-bit parallel data comprising 24 bits of odd RGB video pixel data and 24 bits of even RGB video pixel data. The color space converter 140 may be implemented using an FPGA, a PLD, or a dedicated ASIC.

The received digital video broadcast data signal may have any of a number of well-known video scan formats, e.g., 1080 lines scanned in interlace (1080 i). However, the target digital video display may only support a different video scan format, e.g., 980 lines scanned progressively (980 p). In that case, a scan conversion is necessary to properly display the digital video broadcast data signal on the target digital video display.

Therefore, where the target digital video display does not support the scan format of the received digital video data signal received by the system 100, the scan converter 150 performs the necessary scan conversion. The scan converter 150 converts the color converted framed parallel video data received from the color space converter 140 into a scan format suitable for display on the target digital video display. Beneficially, when the target digital video display is a DVI-compliant display monitor, the scan converter 150 receives Extended Display Identification Data (EDID) from the target digital video display, indicating one or more scan formats supported by the display. Also beneficially, the scan converter 150 includes a de-interlacer and a scaler. The scan converter 150 can be implemented using a commercially available integrated circuit. When, for example, the target digital video display supports the scan format of the received digital video data signal, the scan converter 150 can be omitted or bypassed.

The DVI transmitter 160 receives the color converted framed parallel video data, synchronization signals, and the data clock and converts them into three low voltage transition minimized digital signaling (TMDS) serial data streams, and a TMDS clock. Beneficially, the DVI transmitter provides a DVI-compliant digital video data signal to the target digital video display. The DVI-compliant digital video data signal includes four twisted-pairs of lines comprising three streams of video pixel data (e.g., RGB data) and synchronization data, and a clock. The DVI transmitter 160 can be implemented, for example, using an SI160 integrated circuit from Silicon Image.

The DVI-compliant digital video data signal may then be provided to a DVI input of a target DVI-compliant digital video display, such as a computer monitor. Accordingly, the system 100 can convert high speed uncompressed serial and parallel digital video data signals, (e.g., SMPTE 292M-1998 and SMPTE 259M-1997 standard video signals) commonly used in television studios, post production facilities, and video storage facilities, into a format wherein the video data can be displayed on a low cost digital display device such as a DVI-compliant computer monitor.

Figure 2:
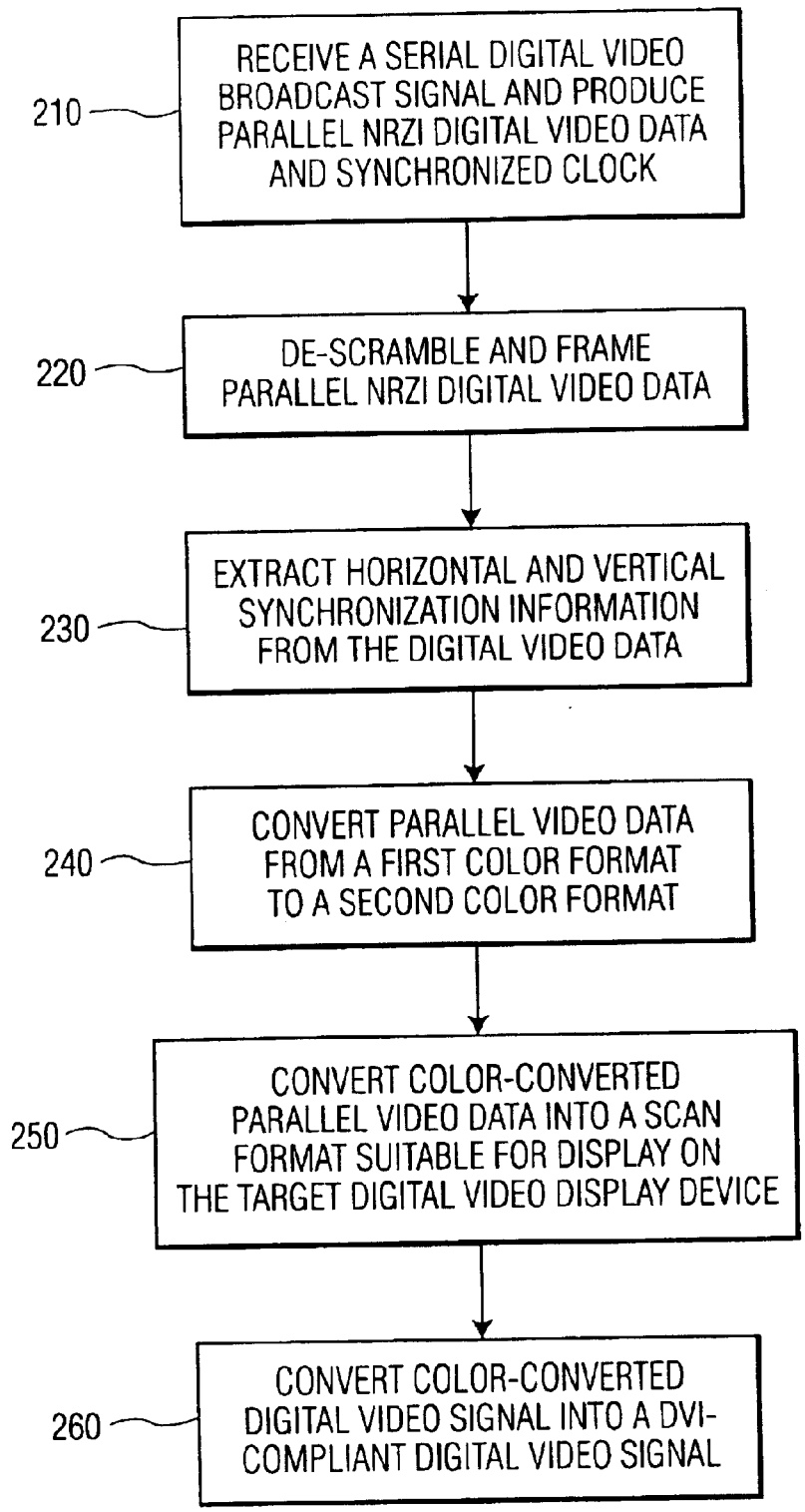
FIG. 2 is a flowchart of a method of processing a digital video data signal for display on a target video display.

FIG. 2 shows a flowchart of a method 200 of processing a digital video data signal for display on a target digital video display such as a computer display monitor having a DVI-compliant input. The method 200 may be accomplished using the system 100 described above. Accordingly, the various steps of the method 200 having been described above, they will not be repeated here.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A system for monitoring a serial digital video broadcast data signal on a digital video display device having a Digital Visual Interface (DVI) compliant input, the system comprising:
   a serial video data receiver receiving the serial digital video broadcast data signal and providing parallel non-return to zero inverted (NRZI) digital video data and a clock synchronized to the parallel NRZI digital video data;
   an NRZI descrambler receiving the parallel NRZI digital video data and providing therefrom framed parallel digital video data;
   a color space converter converting the framed parallel video data from a first color format to a second color format;
   a synchronizer generating horizontal and vertical synchronization signals for the color converted framed parallel video data;
   a scan converter converting the color converted framed parallel video data into a scan format suitable for display on the digital video display device; and
   a digital visual interface driver receiving the color converted framed parallel video data and providing therefrom to the digital video display device a digital visual display signal.

2. The system of claim 1, wherein the first color format is a 4:2:2 YUV color format, and the second color format is an 8:8:8 RGB color format.

3. The system of claim 1, wherein the serial digital video broadcast data signal is a Society of Motion Pictures and Television Engineers (SMPTE) 292M compliant serial digital video data signal.

4. The system of claim 3, wherein the digital visual display signal includes four transition minimized differential signaling (TDMS) data streams.

5. The system of claim 1, wherein the scan converter receives Extended Display Identification Data from the digital video display device and in response thereto converts the color converted framed parallel video data into the scan format suitable for display on the digital video display device.

6. The system of claim 1, wherein the scan converter converts the color converted framed parallel video data from an interlaced scan format to a progressive scan format.

7. A digital video signal processing device for processing a digital video data signal into a form suitable for display on a target digital video display, the device comprising:
   means for extracting horizontal and vertical synchronization information from the digital video data signal; and
   a Digital Visual Interface (DVI) transmitter receiving the digital video data signal and the horizontal and vertical synchronization information, generating therefrom a DVI-compliant digital data signal, and transmitting the DVI-compliant digital video data signal to a DVI input of the target digital video display.

8. The device of claim 7, further comprising a color space converter converting the digital video data signal from a first color format to a second color format before providing the digital video data signal to the DVI transmitter.

9. A digital video signal processing device for processing a digital video data signal into a form suitable for display on a target digital video display, the device comprising:
   means for extracting horizontal and vertical synchronization information from the digital video data signal;
   a Digital Visual Interface (DVI) transmitter receiving the digital video data signal and the horizontal and vertical synchronization information, generating therefrom a DVI-compliant digital video data signal, and transmitting the DVI-compliant digital video data signal to the target digital video display; and
   a color space converter converting the digital video data signal from a first color format to a second color format before providing the digital video data signal to the DVI transmitter wherein the first color format is a 4:2:2 YUV color format, and the second color format is an 8:8:8 RGB color format.

10. A digital video signal processing device for processing a digital video data signal into a form suitable for display on a target digital video display, the device comprising:

means for extracting horizontal and vertical synchronization information from the digital video data signal;

a Digital Visual Interface (DVI) transmitter receiving the digital video data signal and the horizontal and vertical synchronization information, generating therefrom a DVI-compliant digital video data signal, and transmitting the DVI-compliant digital video data signal to the target video display; and a non-return to zero inverted (NRZI) descrambler receiving parallel NRZI digital video data and providing therefrom the digital video data signal.

11. The device of claim 10, further comprising a serial video data receiver receiving a serial digital video broadcast signal and providing the parallel NRZI digital video data to the NRZI descrambler.

12. A digital video signal processing device for processing a digital video data signal into a form suitable for display on a target digital video display, the device comprising:

means for extracting horizontal and vertical synchronization information from the digital video data signal;

a Digital Visual Interface (DVI) transmitter receiving the digital video data signal and the horizontal and vertical synchronization information, generating therefrom a DVI-compliant digital video data signal, and transmitting the DVI-compliant digital video data signal to the target digital video display; and a scan converter receiving Extended Display Identification Data from the target digital video display and in response thereto converting a scan format of the digital video data signal into a scan format suitable for display on the target digital video display.

13. The device of claim 12, wherein the scan converter converts the digital video data signal from an interlaced scan format to a progressive scan format.

14. The device of claim 7, wherein the digital video data signal comprises a plurality of parallel video data lines.

15. A method of processing a digital video data signal for display on a target digital video display, the method comprising:

extracting horizontal and vertical synchronization information from the digital video data signal;

converting the digital video data signal and the horizontal and vertical synchronization information into a Digital Visual Interface (DVI)-compliant digital video data signal; and providing the DVI-compliant digital video data signal to a DVI input of the target digital video display.

16. The method of claim 15, further comprising converting the digital video data signal from a first color format to a second color format.

17. The method of claim 15, further comprising:

receiving a serial digital video broadcast signal and providing therefrom parallel non-return to zero inverted (NRZI) digital video data and a clock synchronized to the parallel NRZI digital video data; and descrambling the parallel NRZI digital video data to provide the digital video data signal.

18. The method of claim 17, wherein the serial digital video broadcast signal is one of a Society of Motion Pictures and Television Engineers (SMPTE) 292M and a SMPTE 259M-1997 compliant digital video data signal.

19. The method of claim 15, further comprising:

receiving Extended Display Identification Data from the target digital video display indicating a scan format suitable for display on the target digital video display; and converting the digital video data signal into the scan format suitable for display on the target digital video display.

20. The method of claim 19, wherein converting the digital video data signal into a scan format suitable for display on the target digital video display comprises converting the digital video data signal from an interlaced scan format to a progressive scan format.

21. The method of claim 19, further comprising:

receiving a serial digital video broadcast signal and providing therefrom parallel non-return to zero inverted (NRZI) digital video data and a clock synchronized to the parallel NRZI digital video data; and descrambling the parallel NRZI digital video data to provide the digital video data signal.

* * * * *